United States Patent
Takehi (10) Patent No.: US 9,621,591 B2
(45) Date of Patent: Apr. 11, 2017

(54) SERVICE PROVISIONING WITH IMPROVED AUTHENTICATION PROCESSING

(71) Applicant: International Business Machines Corporation, Armonk, NY (US)

(72) Inventor: Masahiro Takehi, Tokyo (JP)

(73) Assignee: International Business Machines Corporation, Armonk, NY (US)

( * ) Notice: Subject to any disclaimer, the term of this patent is extended or adjusted under 35 U.S.C. 154(b) by 68 days.

(21) Appl. No.: 14/669,610

(22) Filed: Mar. 26, 2015

(65) Prior Publication Data

US 2015/0295952 A1    Oct. 15, 2015

(30) Foreign Application Priority Data

Apr. 14, 2014 (JP) ................................. 2014-082615

(51) Int. Cl.
*G06F 21/00* (2013.01)
*H04L 9/32* (2006.01)
(Continued)

(52) U.S. Cl.
CPC .............. *H04L 63/20* (2013.01); *G06F 21/41* (2013.01); *G06F 21/577* (2013.01); *H04L 63/08* (2013.01);
(Continued)

(58) Field of Classification Search
CPC . H04L 63/08; H04L 63/0815; H04L 63/1483; H04L 63/20; H04L 67/02;
(Continued)

(56) References Cited

U.S. PATENT DOCUMENTS

2006/0095459 A1* 5/2006 Adelman .............. H04L 12/585
2006/0117104 A1   6/2006 Taniguchi et al.
(Continued)

FOREIGN PATENT DOCUMENTS

JP    2006085719 A   3/2006
JP    2008059550 A   3/2008
(Continued)

OTHER PUBLICATIONS

Matsuzaki, Hiroyuki. JP 2010225110 A, machine translation. Oct. 2010.*

(Continued)

*Primary Examiner* — Michael Simitoski
(74) *Attorney, Agent, or Firm* — Nicholas D. Bowman (57) ABSTRACT

A service provision apparatus and related method which provides a service for a user via a network includes a setting unit, a determination unit, and a decision unit. The setting unit sets an evaluation policy for evaluating reliability of at least one authentication apparatus performing authentication on the user. The determination unit determines whether the authentication made by the at least one authentication apparatus is to be relied on, on the basis of at least one evaluation result obtained by evaluating whether the at least one authentication apparatus is to be relied on, on the basis of the evaluation policy. The decision unit determines that the service is to be provided for the user in response to a determination that the authentication made by the at least one authentication apparatus is to be relied on and information that the user has been authenticated by the at least one authentication apparatus.

7 Claims, 6 Drawing Sheets

(51) Int. Cl.
*H04L 29/06* (2006.01)
*G06F 21/41* (2013.01)
*G06F 21/57* (2013.01)
*G06F 17/30* (2006.01)

(52) U.S. Cl.
CPC .... *G06F 2221/034* (2013.01); *G06F 2221/2115* (2013.01)

(58) Field of Classification Search
CPC .......... G06F 21/31; G06F 21/41; G06F 21/57; G06F 21/577; G06F 2221/034; G06F 2221/2115
See application file for complete search history.

(56) References Cited

U.S. PATENT DOCUMENTS

| | | | | |
|---|---|---|---|---|
| 2009/0199264 | A1* | 8/2009 | Lang | G06F 21/31 726/1 |
| 2011/0010762 | A1* | 1/2011 | Nijdam | H04L 63/0815 726/5 |
| 2012/0260322 | A1* | 10/2012 | Logan | G06F 21/33 726/6 |

FOREIGN PATENT DOCUMENTS

| | | | |
|---|---|---|---|
| JP | 2008276686 A | | 11/2008 |
| JP | 2010097467 A | | 4/2010 |
| JP | 2010225110 A | * | 10/2010 |
| JP | 2013228951 A | * | 11/2013 |
| WO | WO 2010110182 A1 | * | 9/2010 ............. G06F 21/31 |

OTHER PUBLICATIONS

Shiroma, Tadashi et al. "An OpenID Implementation Based on Trust Framework Model". 2012.*

* cited by examiner

SERVICE PROVISIONING WITH IMPROVED AUTHENTICATION PROCESSING

CROSS-REFERENCE TO RELATED APPLICATION(S)

This application claims the benefit of priority to Japanese Patent Application No. 2014-082615, filed Apr. 14, 2014, the contents of which are incorporated herein by reference.

TECHNICAL FIELD

The present invention relates to a service provision apparatus, a program product, and a method.

BACKGROUND ART

A technique is known in which services such as viewing of home pages are provided only for users who have logged in.

SUMMARY OF INVENTION

Technical Problem

However, in the above-described technique, user information, such as an ID and a password, needs to be registered in advance. Unless a user is authenticated by using the ID and the password, it is impossible for the user to use the services.

Solution to Problem

According to a first aspect of the present invention, there is provided a service provision apparatus, and a program product and a method which correspond to the service provision apparatus. The service provision apparatus provides a service for a user via a network. The apparatus includes a setting unit, a determination unit, and a decision unit. The setting unit sets an evaluation policy for evaluating reliability of at least one authentication apparatus performing authentication on the user. The determination unit determines whether or not the authentication made by the at least one authentication apparatus is to be relied on, on the basis of at least one evaluation result obtained by evaluating whether or not the at least one authentication apparatus is to be relied on, on the basis of the evaluation policy. The decision unit determines that the service is to be provided for the user, in response to a determination that the authentication made by the at least one authentication apparatus is to be relied on and information that the user has been authenticated by the at least one authentication apparatus.

In the above-described overview of the present invention, not all of the features of the present invention are listed. A subcombination of these features may constitute the invention.

DESCRIPTION OF EMBODIMENTS

The present invention will be described below in terms of embodiments. The embodiments described below do not limit the invention in the scope of claims. All of the combinations of features described in the embodiments are not necessarily required for the solution in the invention.

Figure 1:
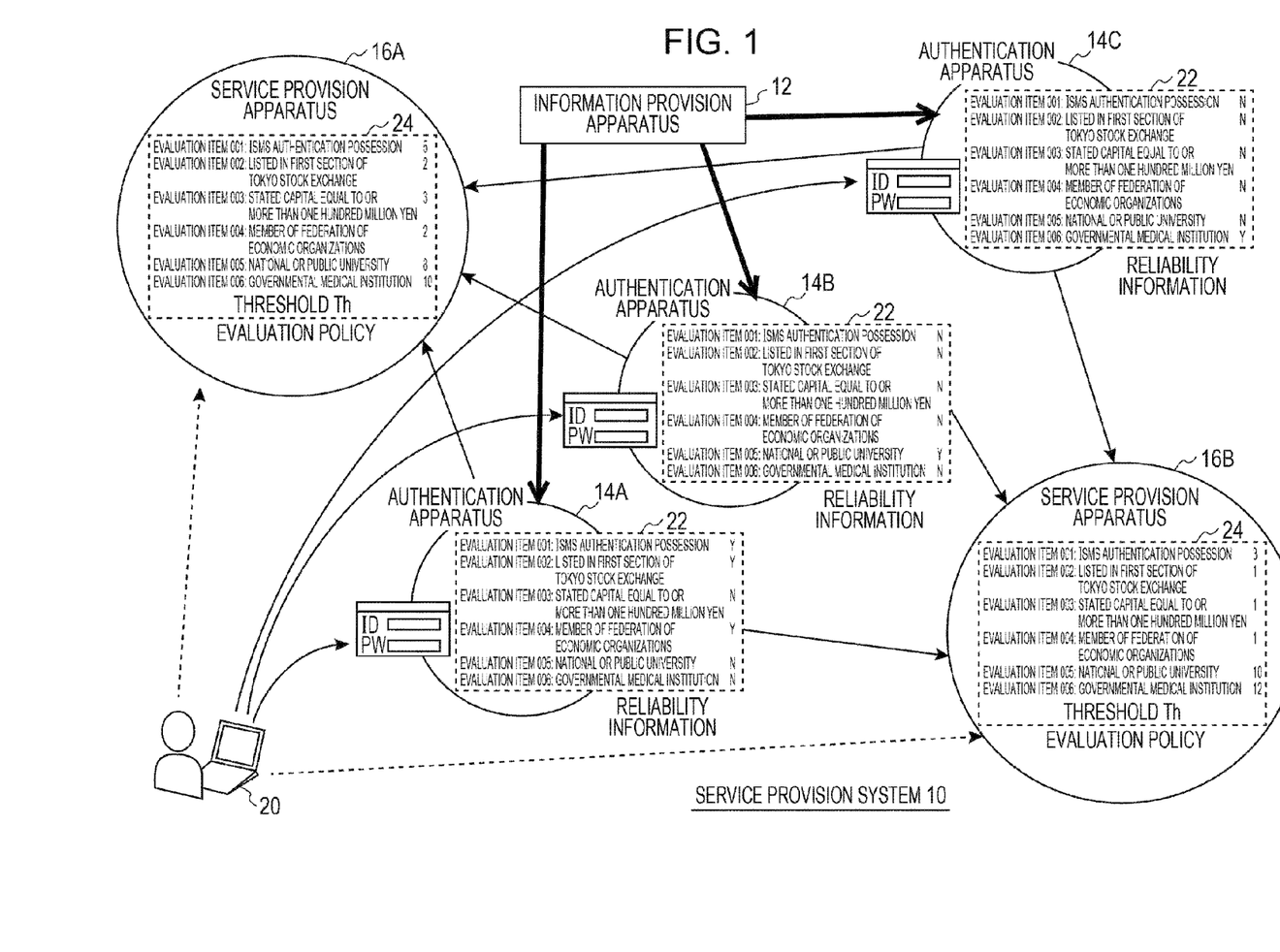
FIG. 1 is a diagram illustrating the overall configuration of a service provision system 10.

FIG. 1 is a diagram illustrating the overall configuration of a service provision system 10. The service provision system 10 includes an information provision apparatus 12, authentication apparatuses 14A to 14C (hereinafter called "authentication apparatuses 14" collectively), and service provision apparatuses 16A and 16B (hereinafter called "service provision apparatuses 16" collectively). The information provision apparatus 12, the authentication apparatuses 14, and the service provision apparatuses 16 are connected to each other via a network. A user terminal 20 is connected to at least the authentication apparatuses 14 and the service provision apparatuses 16 via the network. An exemplary information provision apparatus 12, an exemplary authentication apparatus 14, an exemplary service provision apparatus 16, and an exemplary user terminal 20 are computers. The service provision system 10 provides a service provision environment in which, instead of authentication of a user performed by a service provision apparatus 16 itself, the service provision apparatus 16 can automatically authenticate the user who has been authenticated by an authentication apparatus 14, on the basis of an authentication policy which is set in advance by the service provision apparatus 16.

The information provision apparatus 12 is, for example, a computer system including a computer such as a server computer or multiple computers. The information provision apparatus 12 is provided at an issuing institution which evaluates reliability of each of the authentication apparatuses 14 and/or a company, an organization, or a person who runs the authentication apparatus 14 and which issues reliability information 22 (e.g., a reliability evaluation certificate) representing reliability of the authentication apparatus 14 or the like. The issuing institution manually or automatically evaluates reliability of each of the authentication apparatuses 14 or the like for at least one or more evaluation items, and sets an attribute of the authentication apparatus 14 or the like for each of the evaluation items. In FIG. 1, for example, the reliability information 22 includes attribute values for the following evaluation items: an item indicating whether or not the operation company running an authentication apparatus 14 holds information security management system (ISMS) authentication possession; an item indicating whether or not the operation company is listed in First Section of the Tokyo Stock Exchange; an item indicating whether or not the stated capital of the operation company is equal to or more than one hundred million yen; an item indicating whether or not the operation company is a member of Federation of Economic Organizations; an item indicating whether or not the operation institution is a national or public university; and an item indicating whether or not the operation institution is a governmental medical institution.

Instead of this, or in addition to this, the information provision apparatus 12 may use evaluations from various viewpoints, such as a security management state of an authentication apparatus 14, the credibility status of the authentication apparatus 14, and the number of members of the service provided by the authentication apparatus 14, as evaluation items and attribute values of the reliability information 22. An evaluation value is not limited to two Yes/No options, and may be a numeric value, such as an integer or a real number.

In the present embodiment, the information provision apparatus 12 provides, for the authentication apparatus 14, the reliability information 22 obtained by evaluating each of the authentication apparatuses 14 or the like. Instead of this, the information provision apparatus 12 may provide each piece of the reliability information 22 or the like for the service provision apparatuses 16. When the information provision apparatus 12 provides the reliability information 22 for the authentication apparatus 14 or the service provision apparatuses 16, the information provision apparatus 12 may encrypt the reliability information 22 by using a private key so that it is impossible for an organization or the like other than the issuing institution to tamper with the reliability information 22, and may attach a digital signature to the reliability information 22.

An authentication apparatus 14 is, for example, a computer system including a computer such as a server computer or multiple computers. The authentication apparatus 14 is provided, for example, at a company such as a financial institution or a public institution or the like such as a university, and performs authentication on the user of the user terminal 20. For example, the authentication apparatus 14 registers the user of the user terminal 20 in advance. In response to reception of an access performed by the user from the user terminal 20, the authentication apparatus 14 transmits a screen for authentication such as a login screen for requesting authentication information, such as a login ID and a password, back to the user terminal 20 so that the screen is displayed on the user terminal 20. In the screen for authentication displayed on the user terminal 20, when the user inputs his/her ID and the password associated with the ID, the authentication apparatus 14 receives the ID and the password, and performs authentication on the user.

The authentication apparatus 14 supplies its reliability information 22 obtained from the information provision apparatus 12 to a service provision apparatus 16. The authentication apparatus 14 may function as a service provision apparatus 16 providing a service for a user. For example, in a financial institution or the like, the authentication apparatus 14 itself may provide a financial service for a user.

A service provision apparatus 16 is, for example, a computer system including a computer such as a server computer or multiple computers. The service provision apparatus 16 provides a service, such as viewing of home pages, or access and processing of various type of information, via the network for a user who has accessed the service provision apparatus 16 by using the user terminal 20. Similarly to the related art, the service provision apparatus 16 registers a user in advance. In response to an access performed by the user by using the user terminal 20, the service provision apparatus 16 transmits a screen for authentication back to the user terminal 20 so that the screen is displayed on the user terminal 20. The service provision apparatus 16 receives the ID and the password which are input by the user on the screen for authentication, and performs authentication. Under the condition that the user being a user who has been registered in advance is authenticated, the service provision apparatus 16 provides a service for the user. In addition to this, the service provision apparatus 16 has a function of providing a service without at least a part of the authentication process, for a user who has been authenticated by an external authentication apparatus 14. In the present embodiment, the function in which at least a part of the authentication process is skipped for a user who has been authenticated by an external authentication apparatus 14 is referred to as "federation or federated single sign-on".

The service provision apparatus 16 according to the present embodiment can independently define the type of authentication apparatus 14 for which authentication is to be relied on, by using an evaluation policy 24 on the service provision apparatus 16 side. In federation, the service provision apparatus 16 obtains the reliability information 22 issued by the information provision apparatus 12, from the authentication apparatus 14 (or the information provision apparatus 12), and evaluates the reliability information 22 on the basis of the evaluation policy 24. The service provision apparatus 16 determines whether or not authentication made by the authentication apparatus 14 is to be relied on, on the basis of the evaluation result, and provides a service for the user for whom authentication is relied on. An exemplary service is viewing of home pages. The service provision apparatus 16 may also function as an authentication apparatus 14 performing authentication on a user who is going to use a service provided by another service provision apparatus 16. In the federated single sign-on scheme according to the present embodiment, when a user who has been registered in advance is authenticated by an authentication apparatus 14, the service provision apparatus 16 may skip at least a part of the authentication for the user. Instead of this, or in addition to this, when a user who has not been registered is authenticated by an authentication apparatus 14, the service provision apparatus 16 may provide a service without at least a part of the authentication in a state in which the user is not registered in the service provision apparatus 16, or in a state in which the user is newly registered.

The evaluation policy 24 includes a weight for each of the attributes of the reliability information 22, and a threshold Th which is a criteria for determining reliability of the authentication apparatus 14. For example, in the evaluation policy 24 of the service provision apparatus 16A, "5" is set as a weight for the attribute "ISMS authentication possession"; and "2", for the attribute "listed in First Section of the Tokyo Stock Exchange". Similarly, a weight is set to each of other evaluation items. In the evaluation policy 24 of the service provision apparatus 16A, a positive integer, such as "8" or "10", is set as the threshold Th. When a score obtained by weighting multiple attributes included in the reliability information 22 of the authentication apparatus 14 with the weights specified in the evaluation policy 24 is equal to or more than the threshold Th, the service provision apparatus 16 determines that authentication made by the authentication apparatus 14 is to be relied on.

According to the service provision system 10 described above, the service provision apparatus 16 may provide a service even for a user who has not been authenticated by the service provision apparatus 16 itself, under the condition that an authentication apparatus 14 has authenticated the user. The service provision apparatus 16 evaluates the authentication apparatus 14 operating in federation, on the basis of the evaluation policy 24 which is set in the service provision apparatus 16, and produces a determination. In such a service provision system 10, the manager of the service provision apparatus 16 may perform operation in such a manner that at least a part of authentication made by the service provision apparatus 16 is skipped for a user who has been already authenticated by an authentication apparatus 14 whose authentication capability is fully relied on, on the basis of the evaluation policy which is set by the manager himself/herself. Authentication is evaluated by the service provision apparatus 16 on the basis of the evaluation policy 24. In the case where a new authentication apparatus 14 starts operation, even when the manager of the service provision apparatus 16 does not recognize the new authentication apparatus 14, the service provision apparatus 16 may determine whether or not federated single sign-on is to be performed, by evaluating the authentication apparatus 14 on the basis of the evaluation policy 24. Therefore, according to the service provision system 10 according to the present embodiment, federated single sign-on scheme may be easily applied to an unknown authentication apparatus 14.

The manager of the service provision apparatus 16 may use the service provision system 10 according to the present embodiment from the viewpoint of evaluation of reliability of a user himself/herself. That is, the manager of the service provision apparatus 16 may use the evaluation policy which is set by the manager himself/herself, to set a condition for an authentication apparatus 14 which may be fully relied on. The manager of the service provision apparatus 16 recognizes a user who has been authenticated by an authentication apparatus 14 which may be fully relied on, to be a user who may be fully relied on. For such a user, the manager of the service provision apparatus 16 may provide a service of the service provision apparatus 16 without user registration in the service provision apparatus 16.

Figure 2:
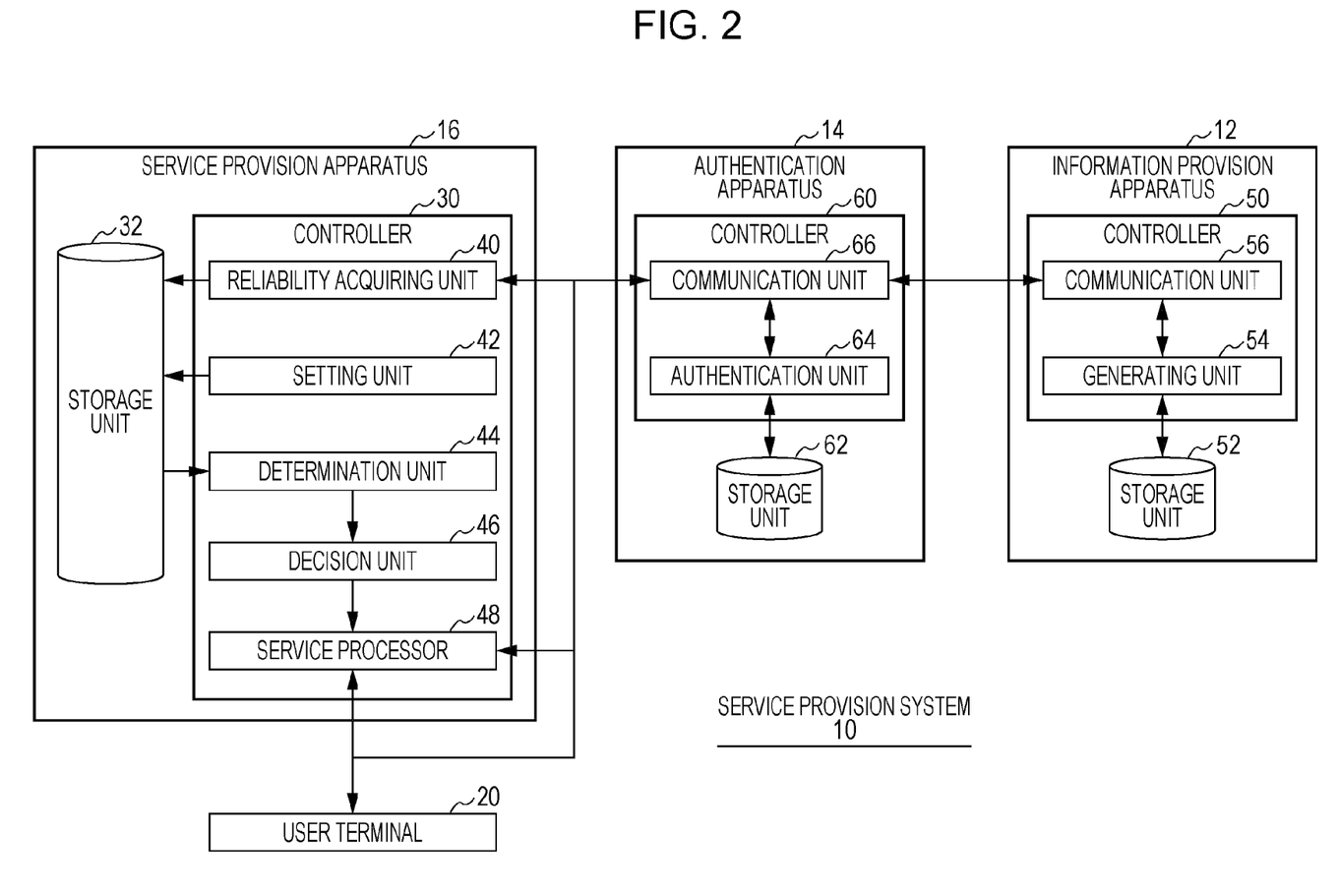
FIG. 2 is a diagram illustrating the configuration of a service provision apparatus 16.

FIG. 2 is a diagram illustrating the configuration of the information provision apparatus 12, an authentication apparatus 14, and a service provision apparatus 16.

The information provision apparatus 12 includes a controller 50 and a storage unit 52. The controller 50 includes, for example, an arithmetic processing unit including a central processing unit (CPU) or the like, and its peripheral circuit section, which are included in a computer. The controller 50 includes a generating unit 54 and a communication unit 56. The controller 50 may read programs from a secondary storage such as a hard disk in the storage unit 52, the network, or the like, thereby functioning as the generating unit 54 and the communication unit 56. A part or the entirety of the generating unit 54 and the communication unit 56 may be constituted by using hardware such as circuits.

The generating unit 54 generates the reliability information 22 of an institution or a company for the authentication apparatus 14 on the basis of information which is input by an issuer or the like in an institution issuing a digital certificate, and stores it in the storage unit 52. The generating unit 54 may cause an issuer or the like to input an attribute value for each of the evaluation items, may generate the reliability information 22 including the attribute values which are input, and may store it in association with the authentication apparatus 14 in a reliability information database or the like provided in the storage unit 52. In this case, the generating unit 54 may encrypt the reliability information 22 by using a private key, and/or may attach a digital signature. The communication unit 56 obtains the reliability information 22 from the generating unit 54, and transmits it to the authentication apparatus 14 (or the service provision apparatus 16).

The authentication apparatus 14 includes a controller 60 and a storage unit 62. An exemplary controller 60 is an arithmetic processing unit including a CPU or the like. The controller 60 includes an authentication unit 64 and a communication unit 66. The controller 60 may read programs from a secondary storage such as a hard disk in the storage unit 62, the network, or the like, thereby functioning as the authentication unit 64 and the communication unit 66. A part or the entirety of the authentication unit 64 and the communication unit 66 may be constituted by using hardware such as circuits.

The authentication unit 64 performs authentication on a user on the basis of an ID and a password which are input from the user. The communication unit 66 obtains the reliability information 22 from the information provision apparatus 12, and stores it via the authentication unit 64 in the storage unit 62. The communication unit 66 obtains the reliability information 22 via the authentication unit 64 from the storage unit 62, and transmits it to the service provision apparatus 16. The communication unit 66 relays communication between the user terminal 20 and the authentication unit 64.

The service provision apparatus 16 includes a controller 30 and a storage unit 32.

An exemplary controller 30 is an arithmetic processing unit including a CPU or the like. The controller 30 includes a reliability acquiring unit 40, a setting unit 42, a determination unit 44, a decision unit 46, and a service processor 48. The controller 30 may read programs from a secondary storage such as a hard disk in the storage unit 32, the network, or the like, thereby functioning as the reliability acquiring unit 40, the setting unit 42, the determination unit 44, the decision unit 46, and the service processor 48. A part or the entirety of the reliability acquiring unit 40, the setting unit 42, the determination unit 44, the decision unit 46, and the service processor 48 may be constituted by using hardware such as circuits.

The reliability acquiring unit 40 is connected in such a manner as to be capable of receiving/transmitting information from/to the authentication apparatus 14 (or the external information provision apparatus 12). The reliability acquiring unit 40 obtains the reliability information 22 representing reliability of the authentication apparatus 14 from the authentication apparatus 14 (or the external information provision apparatus 12). The reliability acquiring unit 40 stores the obtained reliability information 22 in the storage unit 32.

The setting unit 42 sets the evaluation policy 24 for evaluating reliability of the authentication apparatus 14 which performs user authentication. For example, the setting unit 42 sets the evaluation policy 24 in accordance with a value which is input on the basis of the specific criteria by the owner of the service provision apparatus 16. The setting unit 42 stores the evaluation policy 24 which is set, in the storage unit 32.

The determination unit 44 obtains the reliability information 22 and the evaluation policy 24 from the storage unit 32. The determination unit 44 may obtain the reliability information 22 from the reliability acquiring unit 40, and may obtain the evaluation policy 24 from the setting unit 42. The determination unit 44 determines whether or not authentication made by the authentication apparatus 14 is to be relied on, on the basis of the evaluation result obtained by evaluating, on the basis of the evaluation policy 24, whether or not authentication made by the authentication apparatus 14 is to be relied on. For example, the determination unit 44 evaluates the reliability information 22 on the basis of the evaluation policy, generates the evaluation result, and determines whether or not authentication made by the authentication apparatus 14 is to be relied on, on the basis of the evaluation result.

The decision unit 46 obtains the determination result as to whether or not authentication made by the authentication apparatus 14 is to be relied on, from the determination unit 44. The decision unit 46 obtains authentication information as to whether or not the authentication apparatus 14 has authenticated the user. The decision unit 46 determines whether or not a service is to be provided for the user, on the basis of the determination result and the authentication information. Specifically, in response to the determination that authentication made by the authentication apparatus 14 is to be relied on and the information that the authentication apparatus 14 has authenticated the user, the decision unit 46 determines that a service is to be provided for the user. For example, in response to the determination that authentication made by the authentication apparatus 14 is to be relied on and the information that the authentication apparatus 14 has authenticated the user, the decision unit 46 determines that a service is to be provided for the user without authentication made by the service provision apparatus 16. In contrast, in at least one of the case where it is determined that the authentication apparatus 14 is not to be relied on, and the case where the authentication apparatus 14 has not authenticated the user, the decision unit 46 may determine that the service provision apparatus 16 is to perform authentication on the user.

The service processor 48 provides a service such as viewing of home pages for the user for whom the decision unit 46 determines that a service is to be provided, via the user terminal 20.

The storage unit 32 stores programs and information required for operations of the controller 30. For example, the storage unit 32 stores programs for providing a service, the evaluation policy 24 required for execution of the programs for providing a service, and the like.

Figure 3:
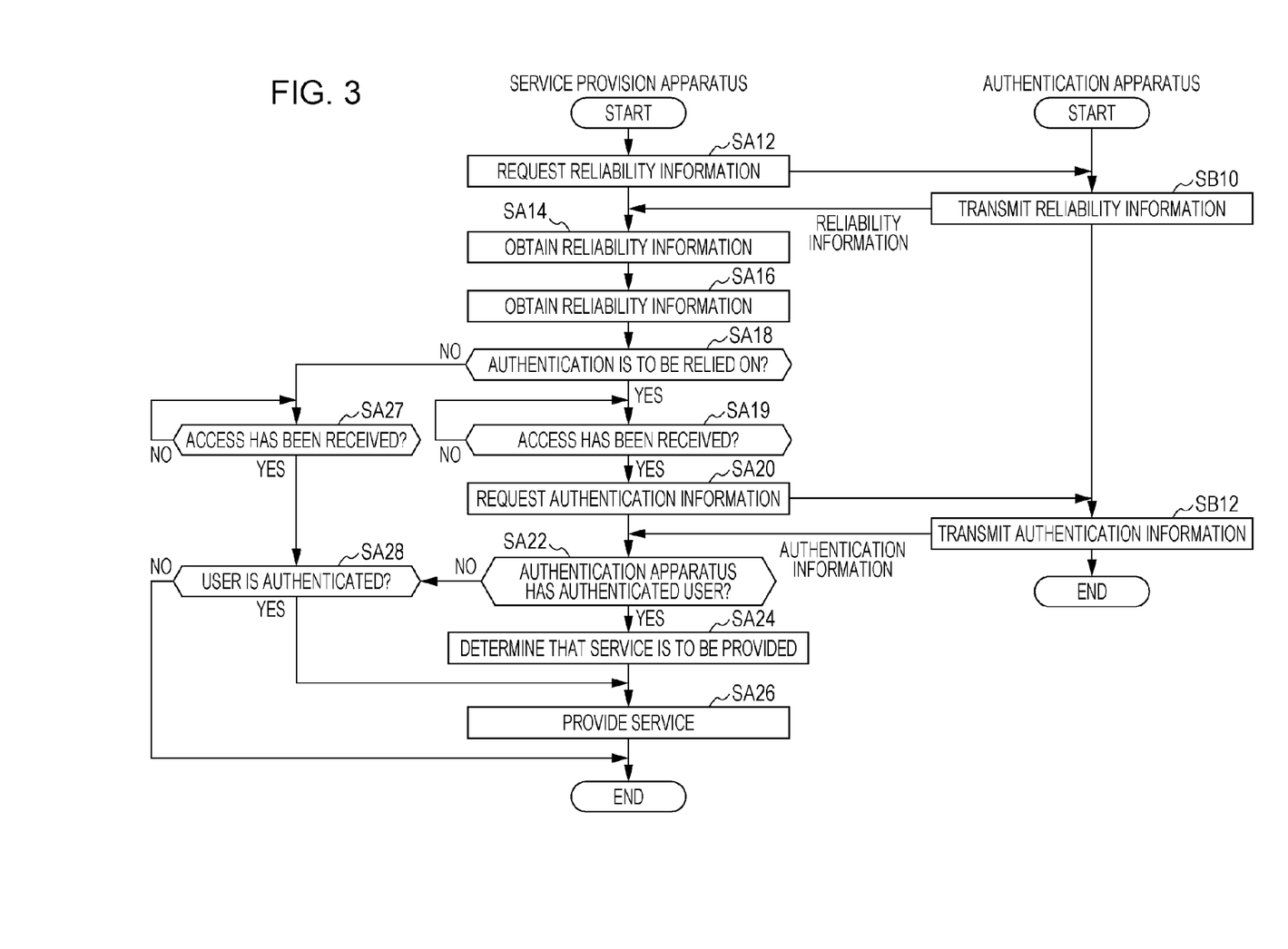
FIG. 3 is a flowchart for describing a service provision process performed by the service provision apparatus 16 and an authentication apparatus 14.

FIG. 3 is a flowchart for describing a service provision process performed by the service provision apparatus 16 and the authentication apparatus 14. The service provision process is performed by the controller 30 reading the programs in the storage unit 32.

The reliability acquiring unit 40 of the service provision apparatus 16 requests the reliability information 22 from an authentication apparatus 14 (SA12). For example, prior to a user access or at regular time intervals independent of user access, the reliability acquiring unit 40 may request the reliability information 22 from the authentication apparatus 14 so as to update the reliability information 22 in advance. The reliability acquiring unit 40 may request the reliability information 22 from multiple authentication apparatuses 14. Instead of this, the reliability acquiring unit 40 may transmit, along with identification information of the authentication apparatus 14, a request to obtain the reliability information 22 of the authentication apparatus 14 to the information provision apparatus 12 so as to obtain the reliability information 22 from the information provision apparatus 12.

In the authentication apparatus 14, when the authentication unit 64 receives the request for the reliability information 22 via the communication unit 66, the authentication unit 64 transmits the reliability information 22 to the service provision apparatus 16 (SB10). The reliability acquiring unit 40 obtains the reliability information 22 from the authentication apparatus 14, and stores it in the storage unit 32 (SA14). In the case where the information provision apparatus 12 has encrypted the reliability information 22 of the authentication apparatus 14 with a private key of the information provision apparatus 12, the reliability acquiring unit 40 decodes the reliability information 22 with a public key of the information provision apparatus 12. Thus, the reliability acquiring unit 40 can obtain the reliability information 22 encrypted by the information provision apparatus 12 with the private key so that tampering is avoided. In the case where a digital signature is attached to the reliability information 22, the reliability acquiring unit 40 may check the digital signature to check if the reliability information 22 is not tampered with.

The determination unit 44 obtains the reliability information 22 and the evaluation policy 24 stored in the storage unit 32, evaluates the reliability information 22 on the basis of the evaluation policy 24, and sets the evaluation result (SA16). For example, the determination unit 44 performs weighting on multiple attributes of the authentication apparatus 14 by using weights in the evaluation policy 24, and generates the evaluation result. Specifically, the determination unit 44 totals the weights in the evaluation policy 24 which correspond to the attributes to which "Y" is set, among the multiple attributes included in the reliability information 22. For example, in FIG. 1, among the weights in the evaluation policy 24 of the service provision apparatus 16A, the service provision apparatus 16A which obtains the reliability information 22 of the authentication apparatus 14A adds up the following weights corresponding to the attributes which are set to "Y" in the reliability information 22 of the authentication apparatus 14A: "5" for the attribute "ISMS authentication possession"; "2" for the attribute "listed in First Section of the Tokyo Stock Exchange"; and "2" for the attribute "member of Federation of Economic Organizations". The service provision apparatus 16A obtains "9" as an evaluation score obtained by totaling the weights. The determination unit 44 generates the evaluation score as an evaluation result. In this case, when the attribute values for the evaluation items are represented as a numeric value, the determination unit 44 may add values, each of which is obtained by multiplying an attribute value by a weight, to the evaluation score.

The determination unit 44 compares the evaluation score with the threshold Th. If the evaluation score is equal to or more than the threshold Th, the determination unit 44 determines that authentication made by the authentication apparatus 14 is to be relied on, and supplies the determination result that the authentication is to be relied on, to the decision unit 46 (YES in SA18).

After the decision unit 46 receives the determination result that authentication made by the authentication apparatus 14 is to be relied on, if the decision unit 46 has received a user access (YES in SA19), the decision unit 46 requests authentication information of the user who has performed the access, from the authentication apparatus 14 (SA20). For example, when the authentication unit 64 receives the request via the communication unit 66, the authentication apparatus 14 causes the user terminal 20 to display a login screen of the authentication apparatus 14 and to receive user input of user registration information, such as an ID and a password. When the user terminal 20 receives an ID and a password, the user terminal 20 transmits the ID and the password to the authentication apparatus 14. In the authentication apparatus 14, the authentication unit 64 transmits the result obtained by determining whether or not the ID and the password of the user which are received from the user terminal 20 are valid, as authentication information via the communication unit 66 to the decision unit 46 (SB12). For example, if the ID and the password of the user are valid, the authentication unit 64 transmits authentication information indicating that authentication has been successfully performed, to the decision unit 46, and redirects the access from the user terminal 20 to the service provision apparatus 16. If the ID and the password of the user are not valid, the authentication unit 64 transmits authentication information that authentication has failed, to the decision unit 46.

The service processor 48 may receive a user instruction to execute federated single sign-on through the authentication apparatus 14 from the user terminal 20, may request the authentication unit 64 to transmit a login screen of the authentication apparatus 14, and may supply the login screen of the authentication apparatus 14 via the decision unit 46 to the user terminal 20. The service processor 48 may transmit the ID and the password which are input by the user on the login screen, along with a request for authentication information, to the authentication apparatus 14. In this case, the authentication apparatus 14 may determine whether or not the ID and the password which are received from the decision unit 46 match those stored in the storage unit 62, and may transmit the determination result as authentication information to the decision unit 46.

The decision unit 46 determines whether or not the authentication apparatus 14 has successfully performed authentication, on the basis of the authentication information (SA22). The service processor 48 may obtain cookie information of the user as authentication information from the user terminal 20, and the decision unit 46 may determine whether or not the authentication apparatus 14 has authenticated the user before, on the basis of the cookie information. If the decision unit 46 determines that the authentication apparatus 14 has authenticated the user (YES in SA22), the decision unit 46 determines that a service is to be provided for the user (SA24). The service processor 48 receives the determination of the decision unit 46, and provides a service for the user of the user terminal 20 (SA26).

If the evaluation score of the authentication apparatus 14 is less than the threshold Th, the determination unit 44 determines that authentication made by the authentication apparatus 14 is not to be relied on (NO in SA18). In this case, if the decision unit 46 has received a user access (YES in SA27), the decision unit 46 performs the process in step SA28. If the decision unit 46 determines that the authentication apparatus 14 has not authenticated the user (NO in SA22), the decision unit 46 performs the process in step SA28.

The decision unit 46 determines whether or not the service provision apparatus 16 itself authenticates the user (SA28). For example, the service processor 48 provides a login screen into the service provision apparatus 16 for the user terminal 20. When the user inputs the ID and the password of the user which have been registered in the service provision apparatus 16 in the login screen, the service processor 48 receives the ID and the password from the user terminal 20, supplies them to the decision unit 46. The decision unit 46 performs authentication on the user by using the ID and the password which are received from the service processor 48. If the user is successfully authenticated (YES in SA28), a service is provided for the user (SA26). If the decision unit 46 determines that the user fails to be authenticated, (NO in SA28), a service is not provided and the process ends.

As described above, in the service provision apparatus 16, the determination unit 44 evaluates reliability of the authentication apparatus 14 which has authenticated a login of the user, by using the evaluation policy 24, and the decision unit 46 determines whether or not a service is to be provided for the user, on the basis of the evaluation result obtained by determining whether or not authentication made by the authentication apparatus 14 which operates in federation is to be relied on. Therefore, differently from OpenID in which reliability of a user is determined on the basis of an authentication server or the like which is specified by the user and whose reliability is unknown, the service provision apparatus 16 may determine reliability of the user through reliability of authentication made by the authentication apparatus 14, on the basis of the evaluation policy 24 which is set by the setting unit 42, that is, on the basis of the specific criteria, and may provide a service.

In the service provision apparatus 16, the decision unit 46 determines whether or not a service is to be provided for the user, depending on the determination result which is made by the determination unit 44 and which is obtained by determining whether or not authentication made by the authentication apparatus 14 is to be relied on, on the basis of the evaluation policy 24 and the reliability information 22 of the authentication apparatus 14 which is issued by the information provision apparatus 12. Thus, the service provision apparatus 16 determines whether or not authentication made by the authentication apparatus 14 is to be relied on, on the basis of the reliability information 22 issued by the information provision apparatus 12 which is a third-party institution, improving a degree of reliability of the determination. Accordingly, even if a service provision apparatus 16, especially a new service provision apparatus 16, does not employ a way like one employed in Security Assertion Markup Language (SAML), in which the service provision apparatus 16 cooperates with another service provision apparatus 16 and authenticates each other, the service provision apparatus 16 may determine a degree of reliability of the user through reliability of the authentication apparatus 14, and may determine whether or not a service is to be provided for the user, in accordance with the degree of reliability.

In the service provision apparatus 16, on the basis of the determination result made by the determination unit 44 on the basis of the reliability information 22 of the authentication apparatus 14 having authenticated the user and the evaluation policy 24 which is set by the setting unit 42, the decision unit 46 determines whether or not a service is to be provided for the user. Thus, the service provision apparatus 16 can provide a service for a user who has been authenticated by a reliable authentication apparatus 14 even if the user is a user who accesses the service provision apparatus 16 the first time, a user whose ID or the like has not been registered, or the like. As a result, the service provision apparatus 16 can suppress occurrence of access from a low reliable user, improving security.

The service provision apparatus 16 determines whether or not a service is to be provided for the user in accordance with the evaluation policy 24 which is set by the setting unit 42. Thus, the setting unit 42 changes the evaluation policy 24, whereby the service provision apparatus 16 can flexibly change the determination criteria for reliability.

Figure 4:
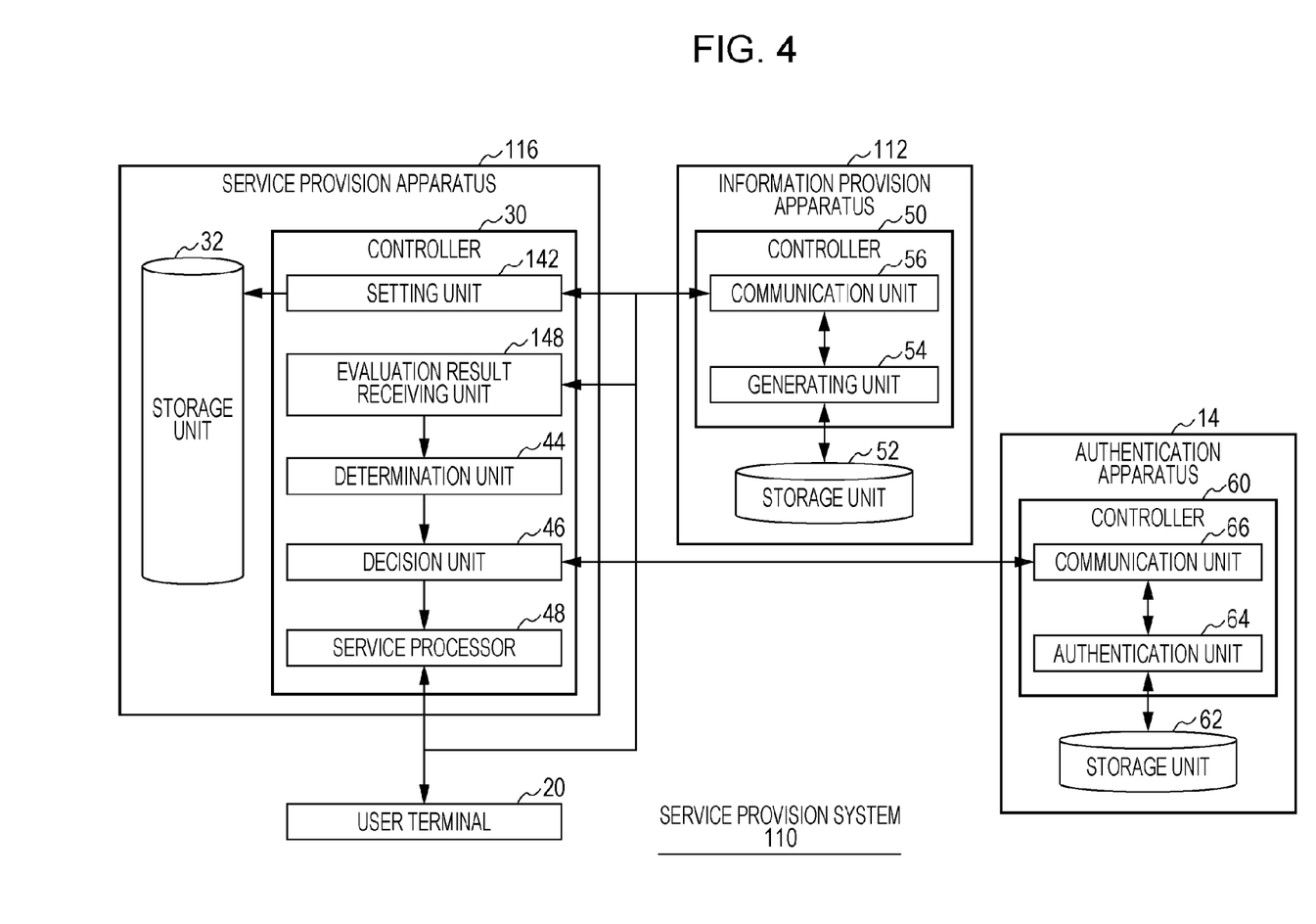
FIG. 4 is a diagram illustrating the overall configuration of a changed service provision apparatus 116.

FIG. 4 is a diagram illustrating the overall configuration of a service provision system 110 according to a modified example of the present embodiment. In the modified embodiment, the configurations achieving functions and/or configurations which are similar to those of the components illustrated in FIG. 2 are designated with identical reference numerals, and will be described only when necessary. The service provision system 110 according to the modified embodiment is different from one in FIG. 2 mainly in that a service provision apparatus 116 obtains the evaluation result from an information provision apparatus 112. The controller 30 of the service provision apparatus 116 includes a setting unit 142, an evaluation result receiving unit 148, the determination unit 44, the decision unit 46, and the service processor 48.

The setting unit 142 sets the evaluation policy 24. The setting unit 142 transmits the evaluation policy 24 which is set, along with identification information of the authentication apparatus 14, to the external information provision apparatus 112.

The evaluation result receiving unit 148 receives, from the external information provision apparatus 112, the evaluation result obtained by evaluating whether or not the service provision apparatus 116 is to rely on authentication made by the authentication apparatus 14, on the basis of the evaluation policy 24 transmitted by the setting unit 142. The evaluation result receiving unit 148 outputs the received evaluation result to the determination unit 44.

The determination unit 44 determines whether or not authentication made by the authentication apparatus 14 is to be relied on, on the basis of the evaluation result obtained from the evaluation result receiving unit 148.

The decision unit 46 obtains the determination result as to whether or not authentication made by the authentication apparatus 14 is to be relied on, from the determination unit 44, and determines whether or not a service is to be provided for the user.

In the information provision apparatus 112, the communication unit 56 receives the identification information of the authentication apparatus 14 and the evaluation policy 24 from the setting unit 142. The communication unit 56 transmits the identification information and the evaluation policy 24 which are received, to the generating unit 54. The generating unit 54 generates an evaluation result obtained by evaluating the reliability information 22 of the authentication apparatus 14 corresponding to the received identification information, by using the evaluation policy 24, and transmits it to the communication unit 56. The communication unit 56 transmits the evaluation result to the service provision apparatus 116.

Figure 5:
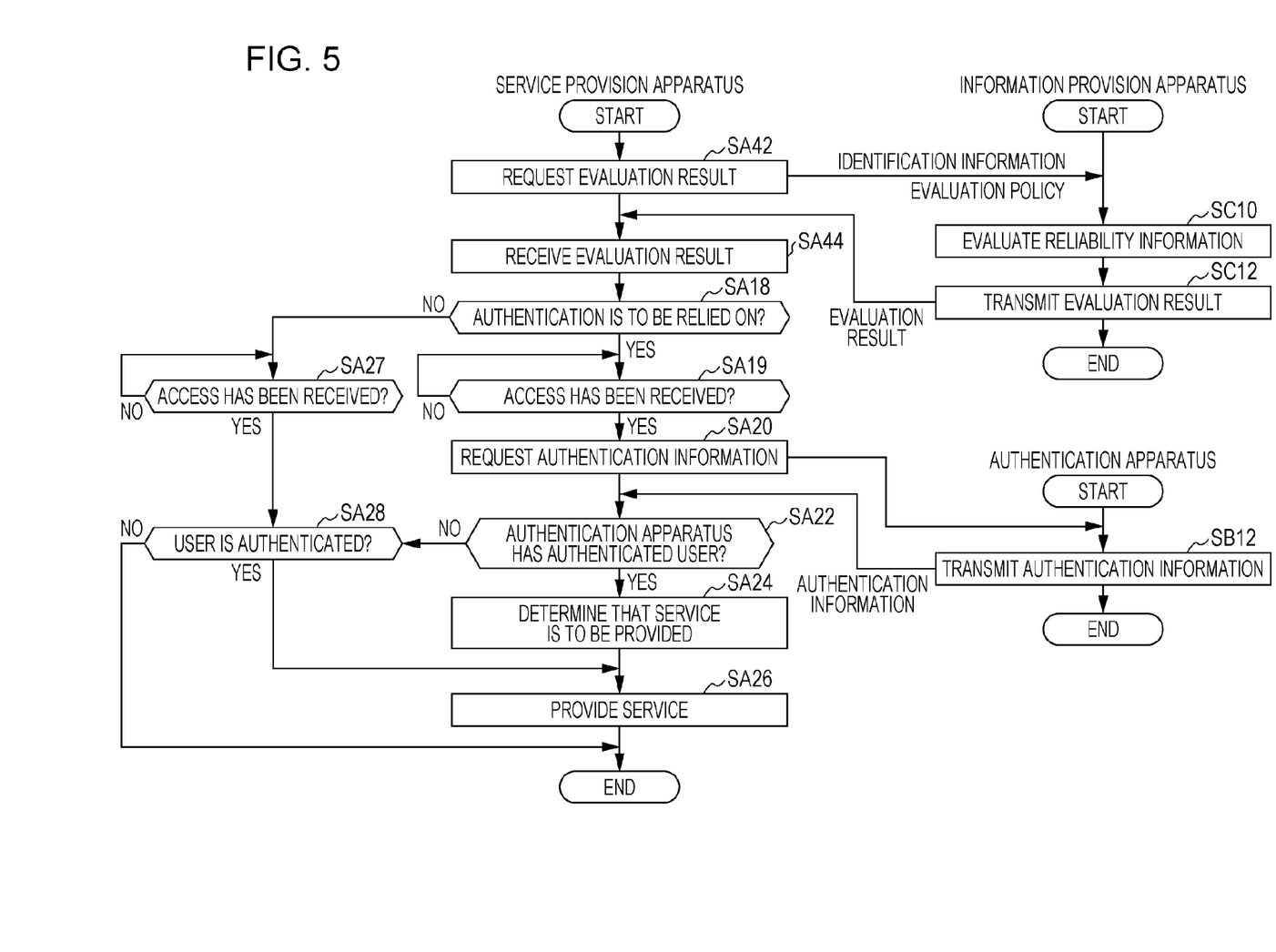
FIG. 5 is a flowchart for describing a service provision process performed by the service provision apparatus 116, the authentication apparatus 14, and an information provision apparatus 12.

FIG. 5 is a flowchart for describing a service provision process performed by the service provision apparatus 116, the authentication apparatus 14, and the information provision apparatus 112. Processes similar to those described by using FIG. 5 are designated with identical step numbers, and will not be described.

The setting unit 142 requests an evaluation result of the authentication apparatus 14 from the information provision apparatus 112 (SA42). When the setting unit 142 requests an evaluation result, the setting unit 142 transmits identification information for identifying the authentication apparatus 14 and the evaluation policy 24 which is set by the setting unit 142, to the information provision apparatus 112.

In the information provision apparatus 112, when the generating unit 54 receives the request for an evaluation result via the communication unit 56 from the service provision apparatus 116, the generating unit 54 generates an evaluation result by evaluating the reliability information 22 of the authentication apparatus 14 corresponding to the obtained identification information on the basis of the obtained evaluation policy 24 (SC10). The generating unit 54 transmits the generated evaluation result via the communication unit 56 to the service provision apparatus 116 (SC12).

In the service provision apparatus 116, when the evaluation result receiving unit 148 receives the evaluation result, the evaluation result receiving unit 148 outputs the evaluation result to the determination unit 44 (SA44). After that, in the service provision apparatus 116, the determination unit 44 and the decision unit 46 perform the processes of step SA18 and its subsequent steps.

The functions, the connection relationship, and the like of the configurations in the above-described embodiments may be changed as appropriate. Some or all of the configurations in the embodiments may be combined as appropriate.

The authentication apparatus 14 may transmit the reliability information 22 including time information representing a time at which the user has been authenticated, to the service provision apparatus 16 or 116. In this case, the determination unit 44 of the service provision apparatus 16 or 116 may determine whether or not authentication made by the authentication apparatus 14 is to be relied on, within a predetermined time starting from a time corresponding to the time information. Thus, the service provision apparatus 16 may skip authentication in the service provision apparatus 16 under the condition that the user accesses the service provision apparatus 16, for example, before the predetermined time, such as fifteen minutes or three months, elapses after the authentication apparatus 14 has authenticated the user.

The determination unit 44 may obtain the reliability information 22 from multiple authentication apparatuses 14 in advance, may determine whether or not authentication made by each of the authentication apparatuses 14 is to be relied on, and may store the determination result in the storage unit 32. In this case, the determination unit 44 may newly obtain the reliability information 22 of an authentication apparatus 14 for which the predetermined time has elapsed starting from the time corresponding to the time information, may determine whether or not the authentication is to be relied on, and may store the new determination result in the storage unit 32 and update the determination result. Thus, the service provision apparatus 16 or 116 may always store a determination result which is obtained by determining whether or not authentication made by the authentication apparatus 14 is to be relied on and which is made within the predetermined time starting from the time. As a result, the service provision apparatus 16 or 116 may reduce the process of newly obtaining reliability information or the like at every user access, achieving prompt provision of a service to a user.

The service provision apparatus 16 may further include a selection unit that makes the user select an authentication apparatus 14 which is to be used for user authentication among multiple authentication apparatuses 14. For example, the selection unit may display names or the like of the multiple authentication apparatuses 14 in a pull-down menu or the like so as to make the user select one of the authentication apparatuses 14. The selection step may be performed, for example, after step SA19 of receiving an access. The determination unit 44 may display the names of the like of only authentication apparatuses 14 for which authentication is already determined to be relied on, among the multiple authentication apparatuses 14 so as to make the user select an authentication apparatus 14. Thus, the service provision apparatus 16 can provide a wider range of choices with which the user selects an authentication apparatus 14. Accordingly, even when reliability is determined on the basis of the authentication apparatus 14 selected by the user, the determination unit 44 makes a determination on the basis of the specific evaluation policy 24, enabling high accuracy of the determination of reliability to be achieved.

In the service provision apparatus 116, the determination unit 44 may cause an authentication apparatus 14 to be selected from multiple authentication apparatuses 14. The determination unit 44 may make the user select one of the authentication apparatuses 14. When the determination unit 44 receives selection of an authentication apparatus 14 from the user, the determination unit 44 outputs information about the authentication apparatus 14 to the setting unit 142. Thus, the setting unit 142 transmits identification information of the authentication apparatus 14 to the information provision apparatus 112.

The reliability acquiring unit 40 may obtain multiple pieces of reliability information 22 from multiple authentication apparatuses 14, and the determination unit 44 may generate multiple evaluation results corresponding to the multiple pieces of reliability information 22. In this case, the determination unit 44 may use multiple evaluation results of multiple authentication apparatuses 14 which have authenticated the user, to determine whether or not authentication made by an authentication apparatus 14 is to be relied on, on the basis of at least one of the highest evaluation result, the lowest evaluation result, and the average of the totals for the multiple evaluation results. Similarly, the setting unit 142 may obtain multiple evaluation results for multiple authentication apparatuses 14 from the information provision apparatus 12. In this case, the determination unit 44 may use multiple evaluation results for multiple authentication apparatuses 14 that have authenticated the user, to determine whether or not authentication made by an authentication apparatus 14 is to be relied on, on the basis of one of the highest evaluation result, the lowest evaluation result, and the average of the multiple evaluation results.

Thus, for example, in the case where the user has been authenticated by multiple authentication apparatuses 14, the service provision apparatus 16 may determine whether or not authentication made by another authentication apparatus 14 is to be relied on, by taking into consideration the evaluation results for the multiple authentication apparatuses 14.

The setting unit 42 or 142 may change the evaluation policy 24 on the basis of external information obtained from the outside. For example, the setting unit 42 or 142 may change the evaluation policy 24 on the basis of news or information about weather obtained via the network. For example, when the setting unit 42 or 142 obtains news about a big movement in stock price, the setting unit 42 or 142 may change the weight of the attribute "listed in First Section of the Tokyo Stock Exchange". When a political change occurs in a foreign country, the setting unit 42 or 142 may change one of the weights.

Figure 6:
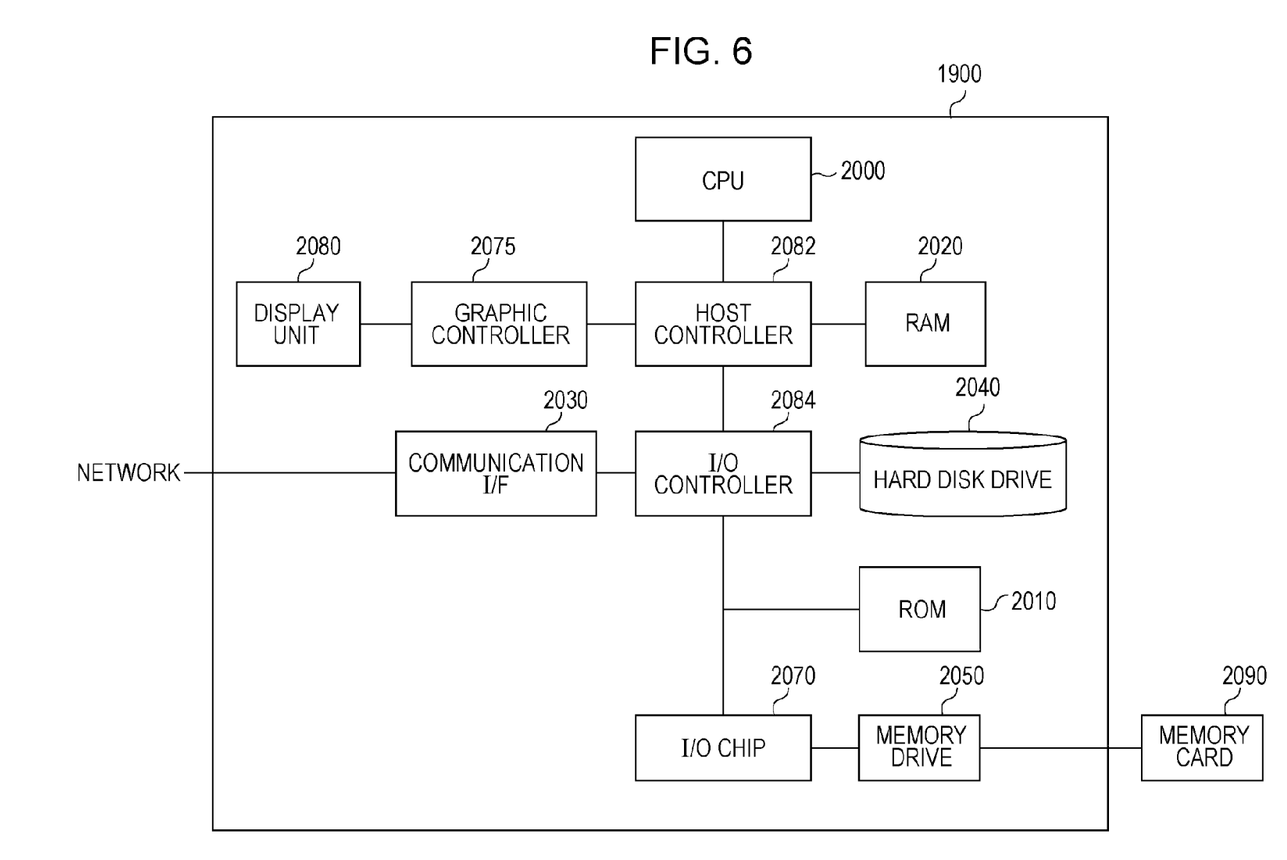
FIG. 6 illustrates an exemplary hardware configuration of a computer 1900 according to the present embodiments.

FIG. 6 illustrates an exemplary hardware configuration of a computer 1900 according to the present embodiments. The computer 1900 according to the present embodiments is an exemplary service provision apparatus 16 or 116. The computer 1900 according to the present embodiments includes a CPU peripheral section having a CPU 2000, a random-access memory (RAM) 2020, a graphic controller 2075, and a display unit 2080 which are connected to each other via a host controller 2082, an input/output section having a communication interface 2030 and a hard disk drive 2040 which are connected to the host controller 2082 via an input/output controller 2084, and a legacy input/output section having a read-only memory (ROM) 2010, a memory drive 2050, and an input/output chip 2070 which are connected to the input/output controller 2084.

The host controller 2082 connects the RAM 2020 to the CPU 2000 and the graphic controller 2075 which access the RAM 2020 at a high transfer rate. The CPU 2000 operates on the basis of programs stored in the ROM 2010 and the RAM 2020, and controls the units. The graphic controller 2075 obtains image data generated by the CPU 2000 or the like on a frame buffer provided in the RAM 2020, and displays it on the display unit 2080. Alternatively, the graphic controller 2075 may include a frame buffer storing the image data generated by the CPU 2000 or the like inside the graphic controller 2075.

The input/output controller 2084 connects the host controller 2082 to the communication interface 2030 and the hard disk drive 2040 which are relatively high-speed input/output apparatuses. The communication interface 2030 communicates with other apparatuses via a network. The hard disk drive 2040 stores data and programs, such as display programs, which are used by the CPU 2000 in the computer 1900.

The input/output controller 2084 is connected to the ROM 2010 and relatively low-speed input/output apparatuses, i.e., the memory drive 2050 and the input/output chip 2070. The ROM 2010 stores boot programs executed when the computer 1900 starts, programs depending on the hardware of the computer 1900, and/or the like. The memory drive 2050 reads out programs such as display programs or data from a memory card 2090, and provides the programs or the data for the hard disk drive 2040 via the RAM 2020. The input/output chip 2070 connects the memory drive 2050 to the input/output controller 2084, and connects various input/output apparatuses to the input/output controller 2084 via a parallel port, a serial port, a keyboard port, a mouse port, and the like.

The programs provided for the hard disk drive 2040 via the RAM 2020 are stored in a recording medium, such as the memory card 2090 or an integrated circuit (IC) card, and are provided by a user. The programs such as display programs are read out from the recording medium, are installed in the hard disk drive 2040 in the computer 1900 via the RAM 2020, and are executed by the CPU 2000.

The programs which are installed in the computer 1900, and which cause the computer 1900 to function as the information provision apparatus 12 or 112 include a generating module and a communication module. These programs or modules operate the CPU 2000 or the like to cause the computer 1900 to function as the generating module and the communication module.

Information processing described in the programs is read into the computer 1900 so as to function as specific means in which software and various hardware resources described above cooperate with each other, i.e., the generating module and the communication module. The specific means achieves calculation or processing of information according to the usage of the computer 1900 according to the present embodiments, whereby a specific information provision apparatus 12 or 112 according to the usage is constructed.

The programs which are installed in the computer 1900, and which cause the computer 1900 to function as the authentication apparatus 14 include an authentication module and a communication module. These programs or modules operate the CPU 2000 or the like to cause the computer 1900 to function as the authentication module and the communication module.

Information processing described in the programs is read into the computer 1900 so as to function as specific means in which software and various hardware resources described above cooperate with each other, i.e., the authentication module and the communication module. The specific means achieves calculation or processing of information according to the usage of the computer 1900 according to the present embodiments, whereby a specific authentication apparatus 14 according to the usage is constructed.

The programs which are installed in the computer 1900, and which cause the computer 1900 to function as the service provision apparatus 16 include a reliability acquiring module, a setting module, a determination module, a decision module, and a service processing module. These programs or modules operate the CPU 2000 or the like to cause the computer 1900 to function as the reliability acquiring module, the setting module, the determination module, the decision module, and the service processing module.

Information processing described in the programs is read into the computer 1900 so as to function as specific means in which software and various hardware resources described above cooperate with each other, i.e., the reliability acquiring module, the setting module, the determination module, the decision module, and the service processing module. The specific means achieves calculation or processing of information according to the usage of the computer 1900 according to the present embodiments, whereby a specific service provision apparatus 16 according to the usage is constructed.

The programs which are installed in the computer 1900, and which cause the computer 1900 to function as the service provision apparatus 116 include a setting module, an evaluation result receiving module, a determination module, a decision module, and a service processing module. These programs or modules operate the CPU 2000 or the like to cause the computer 1900 to function as the setting module, the evaluation result receiving module, the determination module, the decision module, and the service processing module.

Information processing described in the programs is read into the computer 1900 so as to function as specific means in which software and various hardware resources described above cooperate with each other, i.e., the setting module, the evaluation result receiving module, the determination module, the decision module, and the service processing module. The specific means achieves calculation or processing of information according to the usage of the computer 1900 according to the present embodiments, whereby a specific service provision apparatus 116 according to the usage is constructed.

For example, when the computer 1900 communicates with external apparatuses, the CPU 2000 executes communication programs loaded on the RAM 2020, and instructs the communication interface 2030 to perform communication on the basis of processes described in the communication program. Under control of the CPU 2000, the communication interface 2030 reads out transmission data stored in a transmission buffer or the like provided on a storage, such as the RAM 2020, the hard disk drive 2040, or the memory card 2090, to transmit it to a network, or writes data received from a network on a reception buffer or the like provided on a storage. Thus, the communication interface 2030 may transfer received/transmitted data from/to a storage by using direct memory access (DMA). Alternatively, the CPU 2000 may read out data from a storage or the communication interface 2030, i.e., a transfer source, and may write the data in the communication interface 2030 or a storage, i.e., transfer destination, so that the received/transmitted data is transferred.

The CPU 2000 causes all or a necessary part of a file, a database, or the like stored in an external storage, such as the hard disk drive 2040, or the memory drive 2050 (memory card 2090), to be written to the RAM 2020 through DMA transfer or the like, and performs various processes on data on the RAM 2020. The CPU 2000 writes the data which has been processed, back to the external apparatus through DMA transfer or the like. In such a process, the RAM 2020 may be regarded as a storage which temporarily holds data from an external apparatus. Accordingly, in the present embodiments, the RAM 2020, an external storage, and the like are collectively called a memory, a storage unit, a storage, or the like. Various types of information, such as various programs, data, tables, and databases, in the present embodiments are stored on such a storage, and are targets of information processing. The CPU 2000 may hold some pieces of the information in the RAM 2020, on a cache memory, and may read and write the information on the cache memory. In such a configuration, the cache memory functions as a part of the RAM 2020. Accordingly, in the present embodiments, except for being distinguished, a cache memory is also included in the RAM 2020, a memory, and/or a storage.

On data which is read out from the RAM 2020, the CPU 2000 performs various processes that include various calculations, information processing, conditional determination, and searching/replacing of information which are described in the present embodiments, and that are specified by using instruction sequences in programs, and writes the data back to the RAM 2020. For example, when conditional determination is performed, the CPU 2000 compares various variables described in the present embodiments with other variables or constants, and determines whether or not a condition, such as, "larger than", "smaller than", "equal to or larger than", "equal to or smaller than", or "equal to", is satisfied. If a condition is satisfied (or is not satisfied), the process branches to a different instruction sequence, or calls a subroutine. The CPU 2000 may search for information stored in a file, a database, or the like in a storage.

Programs or modules described above may be stored in an external recording medium. As a recording medium, the memory card 2090 as well as an optical recording medium, such as a digital versatile disk (DVD) or a compact disc (CD), a magneto-optical recording medium such as a magneto-optical (MO) disk, a tape medium, a semiconductor memory such as an IC card, and the like may be used. A storage, such as a hard disk or a RAM, which is provided for a server system connected to a private communication network or the Internet may be used as a recording medium, and programs may be provided for the computer 1900 via a network.

As described above, the present invention is described by using the embodiments. However, the technical scope of the present invention is not limited to the range described in the embodiments. It is clear to a person skilled in the art that various changes or improvements may be made to the above-described embodiments. It is clear that an embodiment to which such changes or improvements are made may be also included in the technical scope of the present invention, from the description of the scope of claims.

In the execution order of the processes, such as operations, procedures, steps, stages, and the like in the apparatuses, the systems, the programs, and the methods which are described in the scope of claims, the specification, and the drawings, "before", "prior to", or the like is not particularly indicated. In addition, as long as an output of the previous process is not used in the subsequent process, it should be noted that the processes may be performed in any order. Even when operation flows in the scope of claims, the specification, and the drawings are described by using "first", "next", and the like for the sake of convenience, it does not mean that it is necessary to perform the processes in this order.

REFERENCE SIGNS LIST

10: service provision system
12: information provision apparatus
14: authentication apparatus
16: service provision apparatus
20: user terminal
22: reliability information
24: evaluation policy
30: controller
32: storage unit
40: reliability acquiring unit
42: setting unit
44: determination unit
46: decision unit
48: service processor
50: controller
52: storage unit
54: generating unit
56: communication unit
60: controller
62: storage unit
64: authentication unit
66: communication unit
110: service provision system
112: information provision apparatus
116: service provision apparatus
142: setting unit
148: evaluation result receiving unit
1900: computer
2000: CPU
2010: ROM
2020: RAM
2030: communication interface
2040: hard disk drive
2050: memory drive
2070: input/output chip
2075: graphic controller
2080: display unit
2082: host controller
2084: input/output controller
2090: memory card

What is claimed is:

1. A service provision apparatus for providing a service for a user via a network, the apparatus comprising:
a memory; and
a processor in communication with the memory, the processor configured to obtain instructions from the memory that cause the processor to:
obtain at least one piece of reliability information representing reliability of at least one authentication apparatus performing authentication on the user from the at least one authentication apparatus or an external information provision apparatus;
set an evaluation policy for evaluating the reliability of the at least one authentication apparatus, wherein the evaluation policy is set to include a weight for each of a plurality of attributes of the at least one piece of reliability information;
determine whether the authentication made by the at least one authentication apparatus is to be relied on, on the basis of at least one evaluation result obtained by evaluating whether the at least one authentication apparatus is to be relied on, on the basis of the evaluation policy, wherein the at least one evaluation result is generated by evaluating the at least one piece of reliability information by weighing, on the basis of the evaluation policy, the plurality of attributes for the at least one authentication apparatus; and
determine that the service is to be provided for the user, in response to a determination that the authentication made by the at least one authentication apparatus is to be relied on and information that the user has been authenticated by the at least one authentication apparatus.

2. The service provision apparatus according to claim 1, wherein, in response to the determination that the at least one authentication apparatus is to be relied on and the information that the user has been authenticated by the at least one authentication apparatus, the processor is further configured to determine that the service is to be provided for the user without authentication made by the service provision apparatus; and
wherein, in at least one of a case of a determination that the at least one authentication apparatus is not to be relied on and a case of information that the user has not been authenticated by the at least one authentication apparatus, the processor is further configured to determine that the service provision apparatus is to perform authentication on the user.

3. The service provision apparatus according to claim 1, wherein the at least one piece of reliability information includes time information representing a time at which the at least one authentication apparatus has authenticated the user; and
wherein the processor is further configured to determine whether the authentication made by the at least one authentication apparatus is to be relied on, within a predetermined time starting from a time corresponding the time information.

4. The service provision apparatus according to claim 1, wherein the processor is further configured to encrypt the at least one piece of reliability information of the at least one authentication apparatus with a private key; and
wherein processor is further configured to decode the at least one piece of reliability information of the at least one authentication apparatus with a public key.

5. The service provision apparatus according to claim 1, wherein the processor is further configured to:
obtain a plurality of pieces of reliability information from a plurality of authentication apparatuses, the plurality of pieces of reliability information being included in the at least one piece of reliability information, the plurality of authentication apparatuses being included in the at least one authentication apparatus; and
determine whether the authentication made by the at least one authentication apparatus is to be relied on, on the basis of a plurality of evaluation results corresponding to the plurality of pieces of reliability information, the plurality of evaluation results being included in the at least one evaluation result.

6. A method for providing a service for a user via a network, the method comprising the steps of:
- obtaining at least one piece of reliability information representing reliability of at least one authentication apparatus performing authentication on the user from the at least one authentication apparatus or an external information provision apparatus;
- setting an evaluation policy for evaluating the reliability of the at least one authentication apparatus, wherein the evaluation policy is set to include a weight for each of a plurality of attributes of the at least one piece of reliability information;
- determining whether the authentication made by the at least one authentication apparatus is to be relied on, on the basis of at least one evaluation result obtained by evaluating whether the at least one authentication apparatus is to be relied on, on the basis of the evaluation policy, wherein the at least one evaluation result is generated by evaluating the at least one piece of reliability information by weighing, on the basis of the evaluation policy, the plurality of attributes for the at least one authentication apparatus; and
- determining that the service is to be provided for the user, in response to a determination that the authentication made by the at least one authentication apparatus is to be relied on and information that the user has been authenticated by the at least one authentication apparatus.

7. A computer program product for providing a service for a user via a network, the computer program product comprising instructions stored on a non-transitory computer readable recording medium that are configured to cause a computer to perform, when executed by the computer, the steps of:
- obtaining at least one piece of reliability information representing reliability of at least one authentication apparatus performing authentication on the user from the at least one authentication apparatus or an external information provision apparatus;
- setting an evaluation policy for evaluating the reliability of the at least one authentication apparatus, wherein the evaluation policy is set to include a weight for each of a plurality of attributes of the at least one piece of reliability information;
- determining whether the authentication made by the at least one authentication apparatus is to be relied on, on the basis of at least one evaluation result obtained by evaluating whether the at least one authentication apparatus is to be relied on, on the basis of the evaluation policy, wherein the at least one evaluation result is generated by evaluating the at least one piece of reliability information by weighing, on the basis of the evaluation policy, the plurality of attributes for the at least one authentication apparatus; and
- determining that the service is to be provided for the user, in response to a determination that the authentication made by the at least one authentication apparatus is to be relied on and information that the user has been authenticated by the at least one authentication apparatus.

* * * * *